POWER MEANS FOR FOLDING SHIRTS

Filed Sept. 26, 1950 4 Sheets-Sheet 1

INVENTORS
GEORGE W. JOHNSON &
JOHN R. PETRE
BY
Hyde, Meyer, Baldwin & Doran
ATTORNEYS

*INVENTORS*
GEORGE W. JOHNSON &
JOHN R. PETRE
*BY*
Hyde, Meyer, Baldwin & Doran
ATTORNEYS

POWER MEANS FOR FOLDING SHIRTS

Filed Sept. 26, 1950 4 Sheets-Sheet 3

INVENTORS
GEORGE W. JOHNSON &
JOHN R. PETRE
BY
Hyde, Meyer, Baldwin & Doran
ATTORNEYS Feb. 24, 1953 G. W. JOHNSON ET AL 2,629,521

POWER MEANS FOR FOLDING SHIRTS

Filed Sept. 26, 1950 4 Sheets-Sheet 4

INVENTORS
GEORGE W. JOHNSON &
JOHN R. PETRE

BY

Hyde, Meyer, Baldwin & Doran
ATTORNEYS

UNITED STATES PATENT OFFICE 2,629,521

POWER MEANS FOR FOLDING SHIRTS

George W. Johnson and John R. Petre, Cincinnati, Ohio, assignors to The American Laundry Machinery Company, Cincinnati, Ohio, a corporation of Ohio Application September 26, 1950, Serial No. 186,732

20 Claims. (Cl. 223—37)

The invention relates to novel and improved means for folding laundered shirts.

An object of the present invention is to provide power operated means for automatically, and in proper sequence, performing the series of steps of the method disclosed for manual operation in a copending application, U. S. Serial No. 186,731, filed September 26, 1950, by George W. Johnson, one of the present inventors.

Other objects and advantages will be apparent from a study of the following specification, in conjunction with the accompanying drawings, wherein Fig. 1 is a side elevational view, with housing parts broken away, showing one embodiment of the invention;

In the aforesaid copending application of George W. Johnson a novel and improved method of folding a shirt was disclosed whereby the folding operation begins substantially simultaneously from two oposed locations, namely, near the ends of the two outstretched sleeves, the operation then progressing inwardly. Means was shown for accomplishing this purpose comprising a pair of arms extending in opposite directions from spaced hinge points, a folding plate or wing being hinged at the outer end of each arm. The shirt is placed beneath this assembly, button strip down, and arms extended. The cuffs and lower arm portions project outwardly beyond the wings. In the folding sequence the sleeve ends are first turned inwardly and above the respective wings forming a first fold; the wings are then hingedly swung inwardly making a second longitudinal fold on the hinged edge of the wings; the wing-and-arm overlap is finally turned in, on each side in sequence, making the final longitudinal folds after which the shirt is slipped from the device. A transverse S fold for the shirt tails can be made practically at any intermediate point but this transverse fold is not an essential part of the invention. In said Johnson copending application the various movable elements were operated manually.

As will now appear, the present invention comprises novel and improved power-driven means for effecting the above characterized series of steps.

Figure 1:
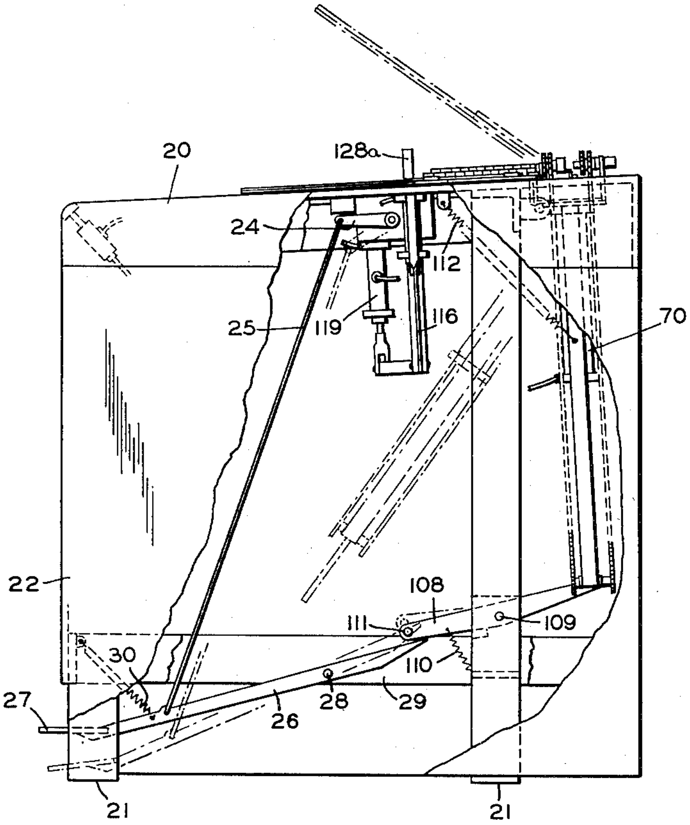
Figure 2:
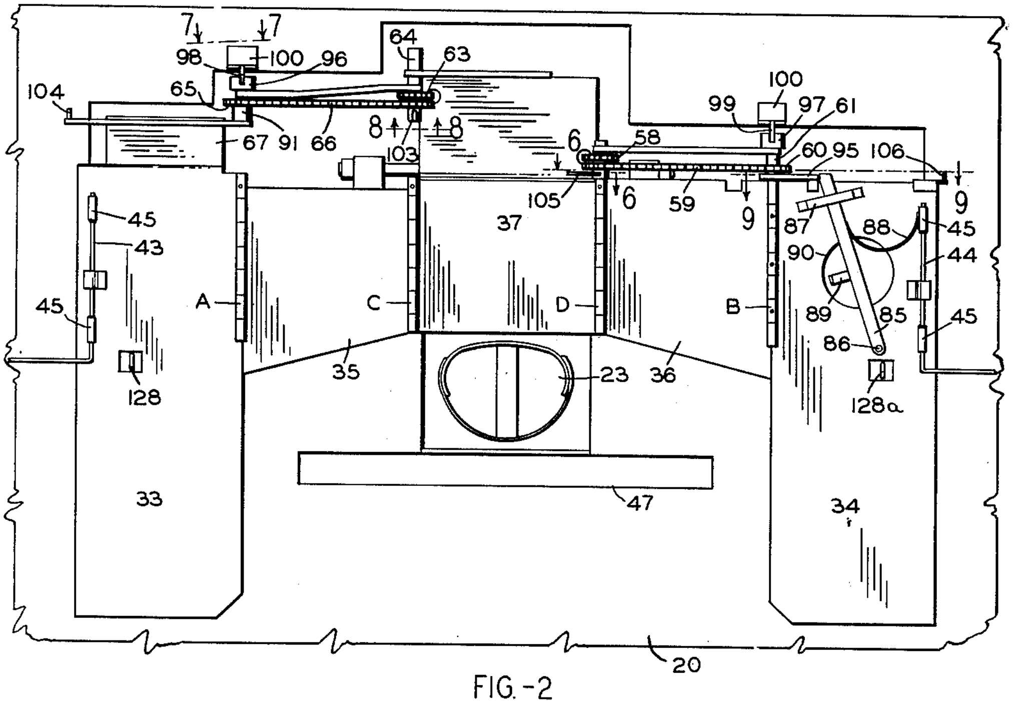
Fig. 2 is a top plan view, as seen from above Fig. 1, showing the folding elements and a fragmentary portion of the folding table top.

Referring first to Figs. 1 and 2 there is shown a folding machine comprising a lay-out table 20 supported on legs 21 housed within walls 22. The table has a centrally disposed collar form, referred to generally by reference character 23, which is conventional in construction and operation, being contractable for the purpose of conveniently dressing a shirt collar thereon, the shirt being disposed on the table, button strip and collar down. The collar form is operated by downward swing of a lever 24 from which a tie rod 25 extends to another lever 26 which is operatable by a foot pedal 27. Lever 26 is pivoted at 28 to a cross brace 29 on the frame. A spring 30 biases the lever to the full line upper position shown in Fig. 1. When the operator steps on the pedal 27 and depresses the lever to the broken line position, the collar form is contracted. After the shirt collar is dressed thereon the operator releases the lever which returns under spring bias to its upper position, the collar form simultaneously returning to its expanded condition so as to frictionally engage the buttoned collar and retain it in place.

The folding operation is performed around a pair of hinged wings or plates 33 and 34. They are hingedly supported on respective axes A and B (Fig. 2) from a respective pair of swingable arms 35 and 36, which in turn are hinged on fixed axes C and D. While axes C and D could be fixed on table top 20, they are carried, in the present instance, by a central plate or body member 37 which in turn is pivotally mounted on a transverse shaft 38 (Figs. 3 and 4) so that the assembly comprising the members 33, 34, 35, 36 and 37 can be swung upwardly to the inclined position shown in broken line in Fig. 1 for convenience in laying out the shirt. A cardboard stiffener 39 is laid on the shirt 40 (Fig. 11), after which the folding assembly means just identified is lowered to the position shown in Fig. 11. As will later appear, such assembly can be snap locked in elevated position, and can be released by the foot pedal leverage means 27, 26, previously described in connection with operation of the collar form.

Figure 11:
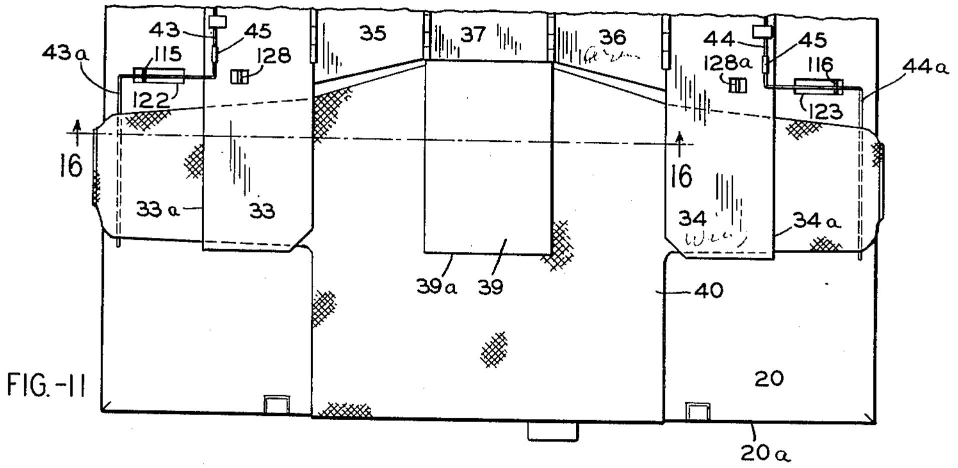
Figs. 11, 12, 13 and 14 are plan views showing successive stages of the folding of a shirt by means of the present apparatus.

Figs. 2 and 11 show a pair of folding flipper arms 43 and 44 swingable in bearings 45 on respective plates 33 and 34. Their purpose is to form the first fold, as will soon appear.

Disregarding for the moment power operating means, and various interlock and lost motion devices for insuring a proper sequential operation of the folding means (such features being hereinafter described), reference may now be had to Figs. 11, 12, 13 and 14 which illustrate the sequence of operations.

Assuming that the shirt 40 has been laid out as described, wings 33 and 34 overlie the upper arm portions, and the sleeve ends extend across the portions 43*a*, 44*a* of flippers 43, 44 (Fig. 11). In accomplishing the first fold, in the present instance, a transverse fold is first effected by pinching the shirt tails at the front edge 20*a* of table 20, or at any other convenient transverse line, and drawing them forwardly a convenient distance, for example until a transverse stoppage line is encountered along the nearest edge 39*a* of stiffener 39.

Figure 12:
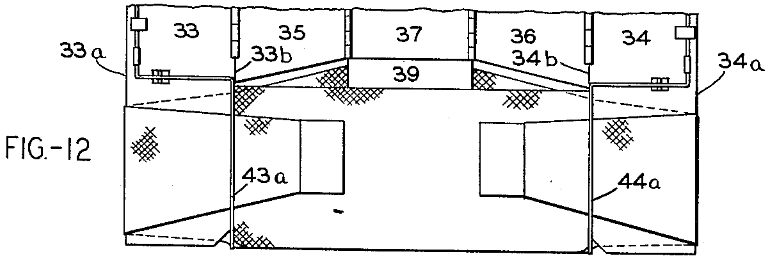

In the first longitudinal folding operations the flipper arm portions 43*a*, 44*a* are swung upwardly and inwardly, throwing the sleeves from the position of Fig. 11 to that of Fig. 12. The first longitudinal folds are positively achieved along the outer free edges 33*a* and 34*a* of wings 33 and 34.

Figure 13:
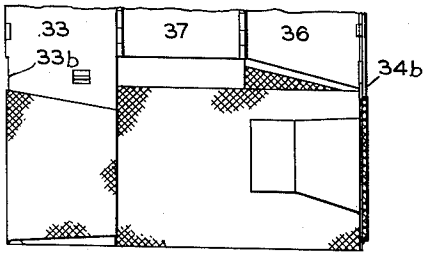

In the next longitudinal folding operations wings 33 and 34 are swung upwardly and inwardly around axes A, B, to overlap respective arms 35 and 36. Fig. 13 shows this partially accomplished. Wing 33 has been completely turned inwardly so as to mask arm 35. Wing 34 is vertical, so as to be visible only "edge on." Longitudinal folds have been made around the edges 33*b*, 34*b* of wings 33, 34.

Figure 14:
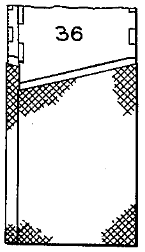

In the final longitudinal folding operations the wing and arm 33, 35 and the corresponding wing and arm 34, 36 are turned inwardly around axes C, D to achieve the results shown in Fig. 14. A binding strip from slot 47 in table top 20 (Fig. 2) is then secured around the folded assembly which is thereafter raised towards the broken line position of Fig. 1, the shirt being slid off the folded wings towards the operator, who then is ready to institute the next cycle.

As may have been noted, all longitudinal folding operations have been performed around either wing 33 or wing 34.

The powered operation and control of the movable elements, namely flipper arms 43 and 44, wings 33 and 34, and connector arms 35 and 36, will now be described.

Figure 3:
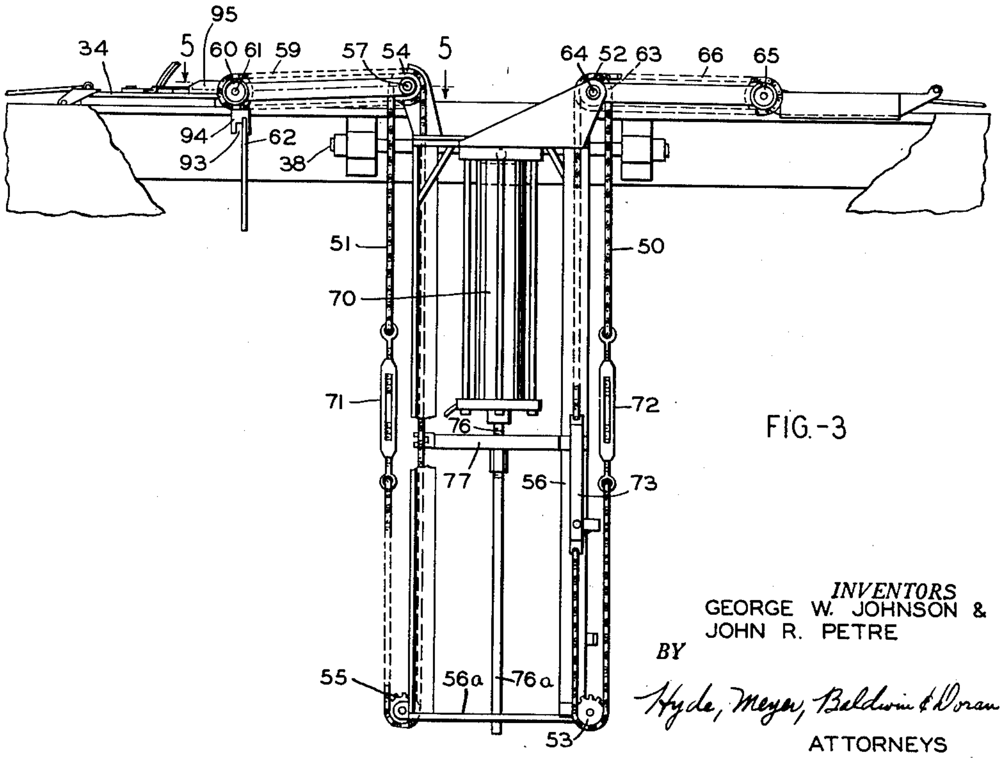
Fig. 3 is a rear view of the operating mechanism for folding elements.
Figures 4, 6, 7, 8, 10:
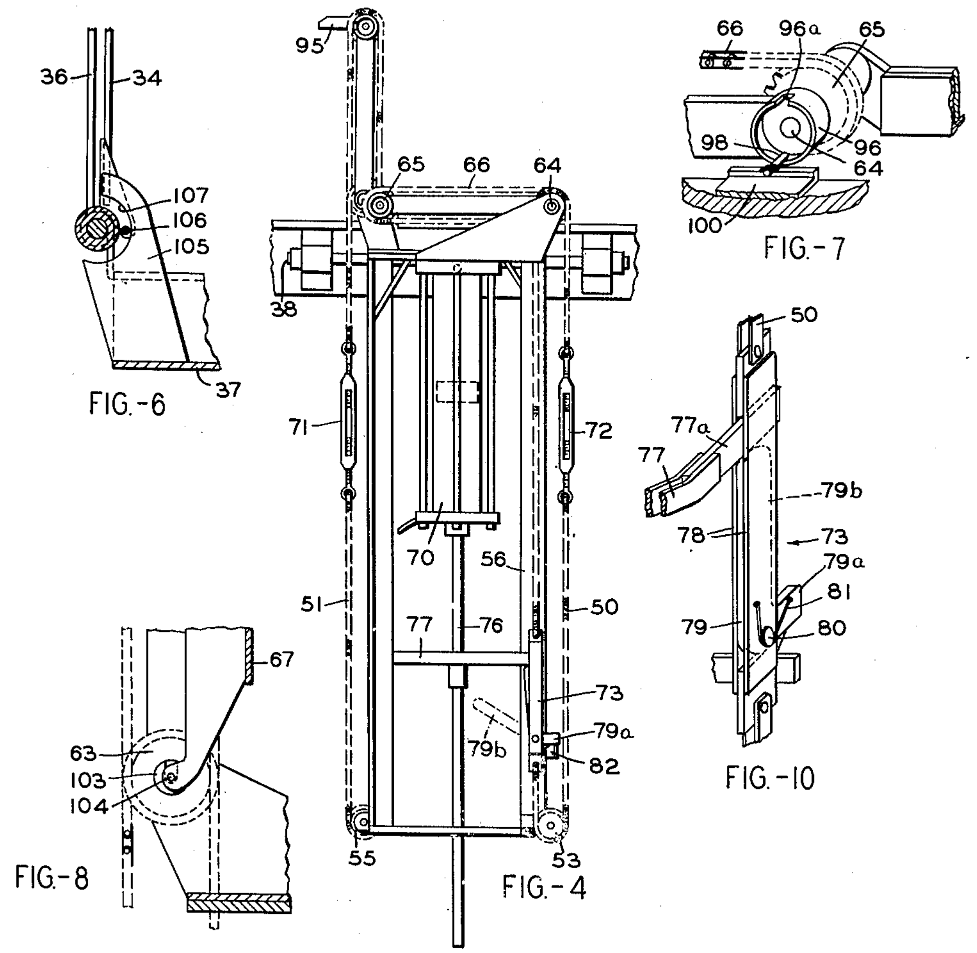
Fig. 4 is a view similar to Fig. 3 but with some of the parts in a different operating position.
Fig. 6 is an enlarged detail view of an interlock mechanism between cooperating folding elements, taken on the line 6—6 of Fig. 2.
Fig. 7 is an enlarged perspective detail view of another interlock mechanism, taken approximately on the line 7—7 of Fig. 2.
Fig. 8 is another enlarged detail sectional view taken on the line 8—8 of Fig. 2.
Fig. 10 is an enlarged perspective view of the lost motion device in the roller chain shown in Figs. 3 and 4.

Referring to Figs. 2, 3 and 12, and assuming for the time being that the first sleeve fold on each side has been made, wings 33 and 34 must be turned inwardly about hinge lines A and B and thereafter about hinge points C and D. In the structure herein shown wing 33 is caused to lead wing 34 by 90° with this relationship continuing to the completion of the operations, and so that wing 33 arrives at its final horizontal position (overlapped by arm 35) when wing 34 is 90° away from final horizontal position, as shown in Figs. 4 and 13. When unfolding (after removal of the folded shirt), wing 34 begins to move first, and is followed by 90° by wing 33 in exact reversal of the folding operation just described. This sequence is accomplished by a system of lost motion devices, latches, and interlocks, as will appear.

Figure 5:
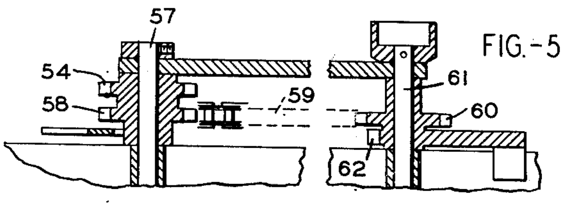
Fig. 5 is a sectional view taken on the line 5—5 of Fig. 3.

The folding operations accomplished by swinging movement of the arms 35 and 36 and the wings 33 and 34 are produced by a continuous advance movement of a pair of roller chains 50 and 51 (Figs. 3 and 4). Chain 50 runs on sprockets 52 and 53 and chain 51 on sprockets 54 and 55. Lower sprockets 53 and 55 are idlers supported on a swingable carriage or frame 56 which depends from body member 37. Upper sprocket 54 (Figs. 3 and 5) is free on hinge pin 57 (heretofore indicated as axis D) and is integral with another sprocket 58 from which a chain 59 extends to a sprocket 60 which is free on hinge pin 61. An abutment finger 62 is integral with sprocket 60, and in idle position depends as shown in Fig. 3. When chain 51 rotates sprocket 54 and thence sprocket 60, finger 62 can rotate 90° clockwise before making contact with the lower face of wing 34, after which further rotation of chain 51 and elements operatively associated therewith causes wing 34 to begin turning clockwise about hinge pin 61. During this first 90° increment of lost motion, wing 33 is being turned around axis A by motion of chain 50 which rotates a compound sprocket 63 (Fig. 2) free on a stub shaft 64, in axial alignment with axis C thereby turning sprocket 65 through a chain 66. Sprocket 65 is secured to an extension 67 of wing 33, so that rotation of sprocket 65 causes rotation of wing 33.

Driving chains 50 and 51 are driven by an air motor 70 carried within frame 56. The chains are endless in character but make only a fractional increment of travel in alternatively opposed directions so that tension turnbuckles 71 and 72 need not travel over the sprockets at top and bottom. Chain 50 also includes a lost motion link 73 (Figs. 3, 4 and 10). Motor 70 (Fig. 17) has a fluid power piston 74. Piston 74 is connected to an operating rod 76 which carries a cross arm 77 having an operating connection at its ends with chains 50 and 51. The connection to chain 51 is fixed. The connection to chain 50 is through the link 73, which in certain instances imparts lost motion. The operation of the link will later appear. A guiding extension 76*a* of the piston rod is slidable in a fitted aperture in the bottom cross brace 56*a* of the frame.

Referring to Figs. 4 and 10, the lost motion device 73 in chain 50 comprises a pair of spaced side walls 78 between which an L-shaped lever 79 is swingable on a pivot 80. A spring clip 81 biases the lever to the position shown in Fig. 10 with its short leg 79*a* extending outwardly and adapted to be intercepted by a trip 82 (Fig. 4) on frame 56 during downward movement of link 73. When so intercepted the said short leg 79*a* is moved upwardly, and the long leg 79*b* is swung out of the link to the broken line position of Fig. 4. It will be apparent that if the tip end 77*a* of cross arm 77 is urged downwardly by the piston rod 76, and the long leg 79*b* is in its vertical position, there is no lost motion, but if leg 79*b* is swung even partially outwardly, said tip end 77*a* will then begin to move with lost motion, relative to the link, swinging leg 79b further and further out.

Still assuming for the time being that flipper arms 43 and 44 have swung the shirt sleeves to the position shown in Fig. 12, the air motor 70 is energized and cross arm 77 begins to move downwardly. Link 73 is not as yet operating in lost motion so that both chains 50 and 51 are effective on their upper sprockets. Wing 33 begins to swing inwardly on axis A but wing 34 does not move until contacted on its lower face by finger 62, after wing 33 has advanced 90°. Wing 33 continues to swing inwardly to its 180° horizontal position, and wing 34 begins to rise to the vertical position. Further rotation of wing 33 is now prevented by its overlapped contact with arm 35, and continued movement of chain 50 causes the arm 35 and wing 33 to turn together about axis C. Similarly, then wing 34, which is lagging wing 33 by 90°, contacts arm 36, they continue to rotate together about axis B. Wing 33 and arm 35 arrive at their final position (Fig. 4) when wing 34 and arm 36 are vertical, and 90° from final position. The motor 70 continues to urge piston rod 76 downwardly to complete the fold around wing 34. At this point to prevent damage to chain 50, the short leg 79a protruding from link 73 intercepts trip 82, fixed on the frame, swinging long leg 79b out of the way of cross bar 77, so that the piston rod can travel downwardly sufficiently to complete the fold without further advance of chain 50.

Obviously, on return or unfolding movement of the piston rod, chains, wings, etc., the lost motion effect still exists in link 73 until cross bar tip 77a reaches the top of its travel within link 73, at which point the lever 79 again reaches the position shown in Fig. 10. During initial upward movement of cross bar 77, therefore, only chain 51 is operating, and wing 34 and arm 36 are beginning to swing outwardly.

Figure 9:
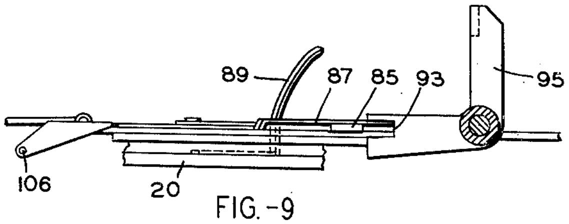
Fig. 9 is another enlarged detail sectional view taken on the line 9—9 of Fig. 2.

Wing 34 has been provided with a specific latching mechanism which insures positive movement of this wing to prevent scraping or clashing against wing 33 and arm 35. Figs. 2 and 9 show this latching mechanism. In the initial idle position (Fig. 2) a flat arm 85 is pivoted at 86 on the top of wing 34, and is held against upward displacement by a bridge guide 87. It is biased to swing counter-clockwise by a spring 88, but is retained in the position shown by a curved cam finger 89 fixed on table top 20, and extending upwardly through an aperture 90 in wing 34. As previously described, initial downward movement of piston rod 76, with consequent movement of chains 51 and 59, causes upward clockwise swing of finger 62. As the finger contacts wing 34 and begins to raise it, arm 85 rides along the curved cam finger, and counter-clockwise around pivot 86 (Fig. 2). Arm 85 eventually slips into a notch 93 in the swingable hub block 94 of sprocket 60 which holds finger 62, thereby positively connecting wing 34 with sprocket 60 for movement therewith in either direction.

When the unfolding operation begins, therefore, reverse pull of chain 51 positively swings wing 34 and arm 36 towards unfolded position, while the lost motion link 73 is preventing return drive on wing 33 and arm 35, as previously described. When wing 34 approaches fully unfolded position, arm 85 makes contact with cam 89, urging it out of slot 93, releasing sprocket 60, and permitting continued movement of driving chains and complete unfolding of wing 33. A second finger 95 on hub block 94 at this time comes down to contact with the upper surface of wing 34, causing it to lie flat on the table top.

For further positive accuracy in controlling the folding operation above described, interlock means is provided to prevent premature movement of arms 35 and 36 until wings 33 and 34 have completed their 180° swing to contact with said arms. These interlocks are similar, being cup shaped members 96 and 97 mounted respectively on the ends of stub shaft 91 and hinge pin 61. Cups 96 and 97 swing with respective arms 35 and 36.

When arms 35 and 36 are lying flat on the table top, as shown for example in Fig. 2, a pair of horizontal pins 98 and 99, carried on brackets 100 on the table top, extend within their respective cups so as to permit rotation of the cups and their respective hinge pins and sockets, but so as to prevent elevation of the cups from the position shown (Figs. 2 and 7). However, when a cup, for example cup 96, has rotated until the slot 96a in its periphery comes into alignment with pin 98, which occurs when the time has arrived for arm 35 to begin to swing upwardly, the cup interlock is released, and arm 35 can swing. The same function is performed by interlock cup 97 for arm 36. These interlock release points of course occur when the respective wings 33 and 34 are folded into contact with their arms 35 and 36. On the return movement of the respective wings and arms, the slots in the cups drop into registry with the pins, and further rotation of sprockets 60 and 65 engages the interlocks as before.

The sprockets on axes C and D are free and there is no positive drive for the arms. It is necessary, therefore, to provide means for interlocking the arms and wings during certain stages in the folding and unfolding operations since otherwise certain portions of the chain movement might turn a wing on its axis without turning the arm at all. This is achieved by a slotted interlock 103 mounted immovably on stub shaft 64 in cooperation with a pin 104 on the rearward extension of wing 33. As best seen in Figs. 2 and 8, when wing 33 rotates 180° on axis A, pin 104 enters the slot in interlock projection 103, said slot extending downwardly to about the stub shaft center. Any further rotation of wing 33 and arm 35 about axis C is accomplished without separation of said wing and arm. The reverse operation occurs when wing 33 is unfolding.

Referring to Figs. 2 and 6, a bracket 105 is mounted on central body member 37, and has a segmental cut-out contour 107 adapted to encircle the hub of sprocket 54 on axis D. A pin 106 on wing 34 is positioned to enter the inner periphery of the cut-out when wing 34 folds into overlap with arm 36. The said wing and arm are locked together until arm 36 is unfolded outwardly to horizontal position.

Figure 15:
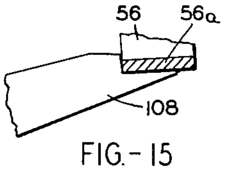
Fig. 15 is a detail view of a latch member for the foot-operated mechanism shown in Fig. 1.

As previously indicated, central body plate 37 is swingably mounted to the table frame on a pivot pin 38 (Figs. 3 and 4). When the wing and arm assembly is down on the table, as shown in full line in Fig. 1, it is latched in that position by a snap interlock between the bottom cross bar 56a of the carriage frame 56 (Fig. 15) and a notched end of a lever 108 pivoted at 109 on the table leg 21. Spring 110 maintains this interlock. The other end of lever 108 has a transverse pin 111 which extends above the work performing end of treadle lever 26, previously described. A spring 112 holds the wing assembly in elevated position, until it is manually pushed downwardly to engage the snap catch just described.

Reference has occasionally been made herein to the operation of flipper arms 43 and 44 in initiating the longitudinal folding operations by tossing the shirt sleeves upwardly and inwardly. This operation will now be described in conjunction with an explanation of the fluid power system, in this embodiment compressed air.

Figure 16:
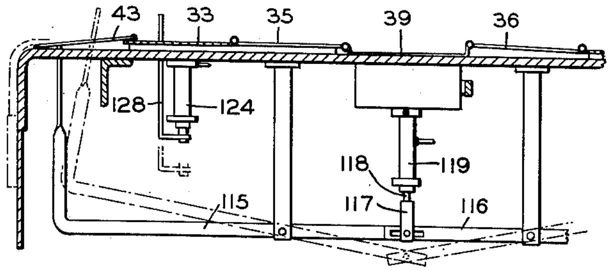
Fig. 16 is a sectional view taken on the line 16—16 of Fig. 11.

The flipper arms 43 and 44 are adapted to be flipped over against wings 33 and 34 by an upward thrust of levers 115 and 116 which are pivoted underneath the table top 20 and have slotted ends connected to a clevis 117 on the end of a piston rod 118 of a small air motor 119. The upper ends of levers 115 and 116 extend through slots 122 and 123 in the table top. When the motor 119 is energized, its piston 120 (Figs. 1, 16 and 17) moves downwardly against the bias of a spring 121 to perform the operation described, giving the first longitudinal fold to the sleeves around the outside edges 33*a* and 34*a* of wings 33 and 34.

A pair of air cylinder motors 124 and 125 are fixed beneath table top 20. Their operation is similar with respect to flipper arms 43 and 44, and only motor 124 will be described. Within it is a piston 126 having a connecting rod 127 to which is linked a push rod 128 extending upwardly through aligned apertures in the table and in wing 33. In the piston position shown in Figs. 1, 16 and 17, the push rod 128 extends above the wing, being biased to such position by spring 129 behind piston 126.

The operation proceeds as follows, starting from a position in which the wings and arms are folded and upwardly inclined as shown in broken line in Fig. 1, the carriage underneath the table being similarly in the broken line position. A shirt 40 is placed button strip down on the table, the foot pedal 27 is depressed, and the collar is dressed over its form 25, after which the pedal is released. A cardboard stiffener 39 may be placed on the shirt, although this is unnecessary. The operator then pushes down the folded wings, etc., until the snap engagement of lever 108 and carriage part 58*a* occurs. The operator then pushes air valve button 132 which operates a valve 133 to admit compressed air through conduit 134 to admit air to the lower end of folder motor cylinder 70. Under operation of chains 50 and 51 as previously described, the wings 33 and 34 and the arms 35 and 36 unfold and when the horizontal portions of the flipper arms 43 and 44 strike the upwardly extending push rods 128 and 128*a* (Fig. 11) the flipper arms are thrown to their open position, on top of the shirt sleeves. The end of each shirt sleeve is now placed on top of flipper arm portions 43*a* and 44*a* by the operator. The shirt tail portion is next folded to an S fold by the operator, who pinches the shirt tails along any line of location, such as the front edge of the table to locate the top transverse fold line (Fig. 12).

The operator now presses air control buton 136 on valve 135 which admits air from conduit 137 to the top ends of motors 125 and 124 to cause withdrawals of push rods 128 and 128*a* beneath the table top level. Air is also admitted through conduit 140 to motor 119 which thereupon operates levers 115 and 116 (Fig. 16 and 17) to throw the flipper arms inwardly, executing the first fold. The button 136 is maintained in depressed position, and when piston 120 of motor 119 moves below the outlet to conduit 141, air is admitted to the upper end of motor 70 which operates chains 50 and 51 to complete folding of the shirt as heretofore described.

Figure 17:
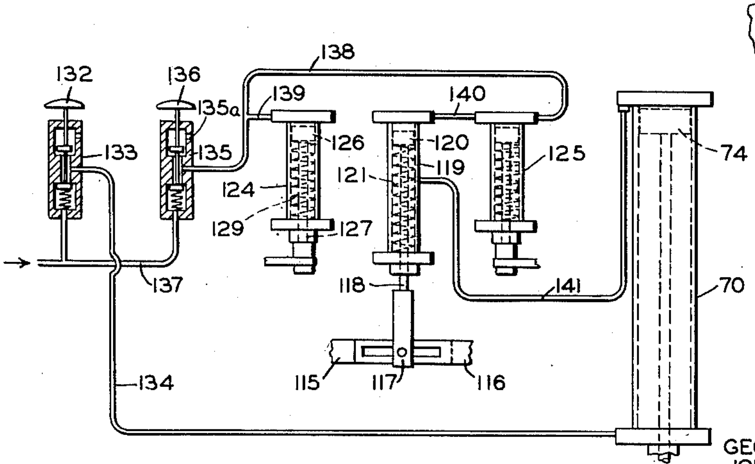
Fig. 17 is a schematic view of the fluid power operating devices and controls therefore.

When button 136 is released, it assumes the position shown in Fig. 17 and motors 119, 124 and 125 exhaust backwardly to valve 135 and outwardly through exhaust outlet 135*a*, whereupon the pistons in the three said motors resume the position shown in Fig. 17, under the influence of their respective biasing springs. A paper band from slot 47 may now be fastened around the folded shirt, after which the foot pedal 27 is pressed to contract the collar form, and thereafter to release the catch shown in Fig. 15. A certain amount of lost motion is provided between the adjacent ends of levers 26 and 108, so that the collar form is positively contracted before the carriage release is actuated. Spring 112 (Fig. 1) then swings the carriage and folding assembly to the broken line position, after which the folded shirt is slipped from the wings towards the operator and the apparatus is ready for the next cycle.

Figure 18:
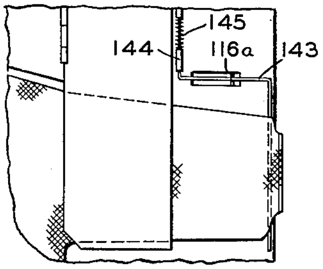
Fig. 18 is a view showing a modification of the first fold arrangement.

Fig. 18 shows a modified flipper arm arrangement. In this embodiment the flipper arm 143 is pivoted at 144 on table top 20, and is biased to the position shown by a spring 145. It is kicked upwardly and inwardly by a power operated lever 116*a* (corresponding to lever 116 in the prior embodiment) but it immediately returns when lever 116*a* is withdrawn, so that a return means, such as rod 128*a* in the prior embodiment, is unnecessary. The advantage to the prior embodiment is that the shirt sleeve was positively maintained in flat folded position while the next fold was being performed.

What we claim is:

1. Shirt folding means adapted to be superposed on a shirt to be folded comprising a right folding arm and a left folding arm swingably fixed on respective axes spaced apart a distance approximately equal to the width of the final folded shirt, a right folding wing and a left folding wing each hinged along its inner edge to the outer edge of the respective right and left arms, said wings being adapted to have respective side portions of the shirt wrapped therearound, power driven linkage operatively connected to said wings for swinging each said wing inwardly whereby to achieve an ultimate mutual overlap, and lost motion means in the linkage for one said wing whereby to cause inward swinging movement of the last said wing to lag behind inward swinging movement of the other said wing.

2. Shirt folding means comprising a folding table, a folding assembly tiltably hinged on said table, said folding assembly comprising a central body member, a right folding arm and a left folding arm respectively swingably hinged on the right and left sides of said body member, a right folding wing and a left folding wing each hinged along its inner edge to the outer edge of said right and left folding arms, power drive means operatively connected to said wings for swinging each said wing inwardly whereby to achieve an ultimate mutual overlap, lost motion means in the power drive means for one said wing whereby to cause swinging movement of the last said wing to lag behind swinging movement of the other said wing, power drive linkage for swinging each superposed wing and arm into a final mutual overlap and additional lost motion means in said power drive linkage whereby to cause swinging movement of one said arm to cease while permitting continued swinging movement of the other said arm.

3. Shirt folding means comprising a folding table, a central body member tiltably fixed on said table, a right folding arm and a left folding arm hingedly connected, respectively, to the right and left sides of said body member and adapted to be swung upwardly and inwardly towards said body member, a right folding wing and a left folding wing each wing hingedly connected along its inner edge to the respective outer edge of said right and left folding arms, and each wing adapted to be swung upwardly and inwardly to overlap its respective arm, and interlock means for maintaining juxtaposed relationship between said wings and their respective arms while said arms are being swung inwardly towards and outwardly from said body member.

4. Folding means as defined in claim 3 wherein arm-locking means is provided, said arm-locking means having a portion thereof fixed to said table and another portion carried by said arms, said arm-locking means being adapted to prevent movement of said arms during swinging movement of said wings into and out of overlapped relationship therewith.

5. Shirt folding means comprising a folding table, a central body member tiltably fixed on said table, a right folding arm and a left folding arm hingedly connected, respectively, to the right and left sides of said body member and adapted to be swung upwardly and inwardly towards said body member, a right folding wing and a left folding wing each wing hingedly connected along its inner edge to the respective outer edge of said right and left folding arms, and each wing adapted to be swung upwardly and inwardly to overlap its respective arm, a motive power source, linkage means operatively connected to said arms and wings and to said motive power source for swinging said arms and wings, a right and left flipper member hingedly mounted adjacent the outer edge of the respective right and left folding wings and adapted to be swung inwardly over its respective wing, and interlock means for maintaining juxtaposed relationship between said wings and their respective arms while said arms are being swung inwardly towards said body member.

6. Folding means as defined in claim 5 wherein said right and left flipper members are hingedly connected to the outer edges of the respective right and left folding wings.

7. Folding means as defined in claim 6 wherein power operated means responsive to said motive power source is provided for flipping said flipper members inwardly to overlie the respective folding wings in initiating a shirt folding operation.

8. Shirt folding means comprising a folding table, a carriage tiltably mounted on said table, spring biasing means engaging said carriage, whereby to maintain it in idle position, latch means for retaining said carriage in folding position against the bias of said spring, operator-operatable latch releasing means which, when operated, permits said carriage to swing from folding to idle position, a folding assembly carried on said carriage and comprising a central body member, a right folding arm and a left folding arm swingably hinged respectively along the right and left edges of said body member, a right folding wing and a left folding wing each hinged along its inner edge to the outer edge of said right and left folding arms, power drive means consisting of a fluid power cylinder, a piston, and a piston rod supported on said carriage and having driving linkage engaging said arms and wings whereby, when energized, to alternately swing said arms and wings inwardly to folding relationship and outwardly from folding relationship, lost motion means in said driving linkage engageable intermittently with one said wing whereby to cause swinging movement of the last said wing to lag behind swinging movement of the other said wing, additional lost motion means also in said driving linkage whereby to permit inward swinging movement of one said arm to cease while permitting continued swinging movement of the other said arm.

9. Folding means as defined in claim 8 wherein arm-locking means is provided, said arm-locking means having a portion fixed to said table and another portion carried by said arms, said arm-locking means being adapted to prevent movement of said arms during swinging movement of said wings into and out of overlapped relationship therewith.

10. Folding means as defined in claim 8 wherein interlock means having a part carried by each said wing and a respective part fixed with respect to said folding table is provided for maintaining overlapped relationship between said wings and said arms, while said arms are being swung to and from overlapped relationship with said body member.

11. Folding means as defined in claim 8 and provided with right and left flipper members swingably mounted respectively adjacent the right and left folding wings and each adapted to be swung inwardly to overlie the respective wing.

12. Folding means as defined in claim 11 wherein said right and left flipper members are hingedly carried on the respective outer edges of said right and left wings.

13. Shirt folding means comprising a folding table, a carriage tiltably mounted on said table, spring biasing means engaging said carriage, whereby to maintain it in idle position, latch means for retaining said carriage in folding position against the bias of said spring, operator-operatable latch releasing means which, when operated, permits said carriage to swing from folding to idle position, a folding assembly carried on said carriage and comprising a central body member, a right folding arm and a left folding arm swingably hinged respectively along the right and left edges of said body member, a right folding wing and a left folding wing each hinged along its inner edge to the outer edge of said right and left folding arms, power drive means consisting of a source of fluid power, a fluid power cylinder in communication with said source of fluid power, a piston, and a piston rod, linkage means operatively connected to said rod and to said arms and wings, right and left flipper means hingedly carried on the respective outer edges of said right and left folding wings, and flipper operating means in fluid flow communication with said source of fluid power effective upon said flippers to swing them inwardly into overlying relationship with their respective wings to initiate a folding operation.

14. Shirt folding means comprising a folding table, a carriage tiltably mounted on said table, spring biasing means engaging said carriage, whereby to maintain it in idle position, latch means for retaining said carriage in folding position against the bias of said spring, operator-operatable latch releasing means which, when operated, permits said carriage to swing from folding to idle position, a folding assembly carried on said carriage, and comprising a central body member, a right folding arm and a left folding arm swingably hinged respectively along the right and left edges of said body member, a right folding wing and a left folding wing each hinged along its inner edge to the outer edge of said right and left folding arms, power drive means consisting of a fluid power cylinder, a piston, and a piston rod supported on said carriage, said arms and wings being each provided with a driven member, a driving member responsive to movement of said piston rod and consisting of link belt means engaging said driven members whereby, when said piston is moved to and fro, to cause alternate folding and unfolding swinging movement of said wings and arms, the driven member for one wing being provided with lost motion means whereby to permit swinging movement of the last said wing to lag behind swinging movement of the other said wing during swinging movement of said wings in one direction, and additional lost motion means consisting of a lost motion link in said link belt whereby to permit swinging movement of one said arm to cease when it arrives at its limit of swing while permitting continued swinging movement of the other said arm.

15. Folding means as defined in claim 14 wherein arm-holding means is provided, said arm-holding means having a portion fixed to said table and another portion carried by said arms, said arm-holding means being adapted to prevent movement of said arms during swinging movement of said wings into and out of overlapped relationship therewith.

16. Folding means as defined in claim 14 wherein interlock means is provided having respective parts carried by said wings, and other respective parts carried by said table for maintaining overlapped relationship between said wings and said arms, while said arms are being swung to and from overlapped relationship with said body member.

17. Folding means as defined in claim 14, and provided with right and left flipper members swingably mounted respectively adjacent the right and left folding wings and each adapted to be swung inwardly to overlie the respective wing.

18. Folding means as defined in claim 17 wherein said right and left flipper members are hingedly carried on the respective outer edges of said right and left wings.

19. Folding means comprising a folding arm swingably mounted on an axis of arm rotation, a folding wing connected to said folding arm and swingably mounted on an axis of wing rotation, power driven means operatively connected to said arm and to said wing for producing folding and unfolding movement of said arm and said wing around their respective centers of rotation, said power driven means including a flexible belt member operatively connected to said arm and said wing whereby, upon continuous movement of said flexible belt member in one direction, to produce sequential swinging movement of said wing and said arm about their respective axes of rotation.

20. Shirt folding means adapted to be superposed on a shirt to be folded, comprising a right folding arm and a left folding arm swingably mounted on respective axes of arm rotation, a right folding wing and a left folding wing respectively connected to said right folding arm and said left folding arm on respective axes of wing rotation, said right and left folding wings being adapted to have respective right and left shirt portions wrapped therearound, and power driven means operatively connected to said arms and wings for producing inward and outward swinging movement of said arms and wings around their respective axes of rotation, said power driven means including a right and a left flexible belt member respectively effective, upon continuous movement thereof, to produce sequential swinging movement of said arms and said wings about their respective axes of rotation.

GEORGE W. JOHNSON.
JOHN R. PETRE.

REFERENCES CITED

The following references are of record in the file of this patent:

UNITED STATES PATENTS

| Number | Name | Date |
|---|---|---|
| 2,508,108 | Gayring et al. ----- | May 16, 1950 |